Figure 1:
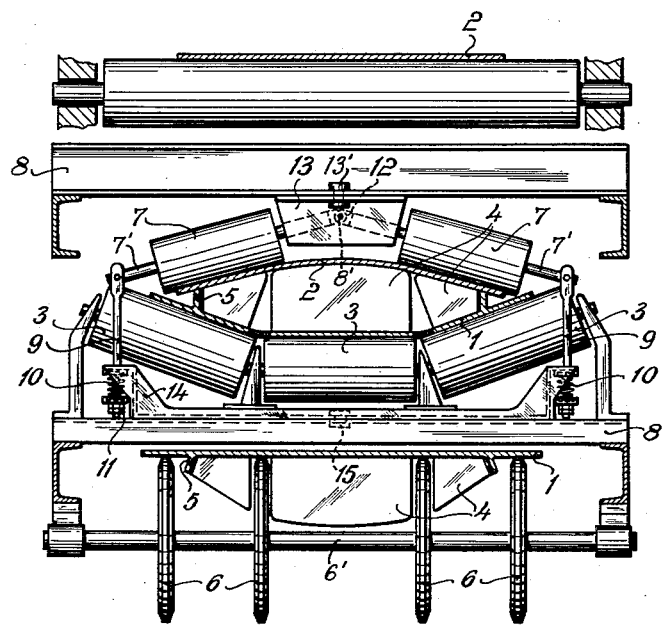

Dec. 27, 1960 F. KAISER 2,966,254
STEEP-SLOPE CONVEYOR
Filed July 29, 1957 2 Sheets-Sheet 1

INVENTOR
Friedrich Kaiser

Dec. 27, 1960 F. KAISER 2,966,254
STEEP-SLOPE CONVEYOR
Filed July 29, 1957 2 Sheets-Sheet 2

INVENTOR
Friedrich Kaiser

United States Patent Office 2,966,254
Patented Dec. 27, 1960

2,966,254

STEEP-SLOPE CONVEYOR

Friedrich Kaiser, Bochum, Germany, assignor to Westfalia Dinnendahl Gröppel Aktiengesellschaft, Bochum, Germany, a German corporation Filed July 29, 1957, Ser. No. 674,787

Claims priority, application Germany Aug. 16, 1956

11 Claims. (Cl. 198—165)

My invention relates to a steep-slope conveyor or elevator particularly for handling pourable materials.

Conveying in the horizontal direction or at a slight inclination is usually effected by means of troughed conveyor belts. A normal conveyor belt, however, can no longer be used when a larger inclination is required. It has been proposed for this purpose to use transversely ribbed belts, i.e. endless conveyor belts with integral transverse ribs or partitioning walls of more or less height; but such ribbed belts are applicable only up to a given inclination beyond which the pourable material will slide off rearwardly over the ribs. It has also been proposed to form steep-slop conveyors of two conveyor belts located one above the other and moving at the same speed, the two belts being pressed against each other by pressure rollers in order to clamp between them the material to be conveyed. Such cover-belt conveyors, however, require uniform deposition and uniform layer thickness of the material because otherwise hollow spaces may occur in which the material will slide back instead of being conveyed upwardly.

It is an object of my invention to eliminate such deficiencies and limitations of the known steep-slope belt conveyors.

To this end and in accordance with my invention, the conveyor is provided with a box- or rib-type endless belt upon whose transverse walls or partitioning members a cover belt is pressed by means of pressure rollers or similar devices. As a result a series of individually enclosed conveying spaces or boxes are formed from which the material cannot escape during upward or downward conveyance. Such a conveyor has the advantage of operating independently of the quantity of material being supplied, because the pourable material is retained in the individual conveying spaces regardless of whether the next following space is likewise filled or empty.

According to another feature of the invention, either the transversally ribbed conveyor belt or the cover belt is provided with lateral, marginal ledges which, when the conveyor opens itself ahead of the top pulley, prevent the material from sliding laterally off the belt which at this location converts from trough shape back into stretched position.

According to a further feature of the invention, the pressure rollers which force the pressure run of the upper belt toward the ribs or partitioning members on the carrying run of the lower belt, are made adjustable for controlling or varying the engaging pressure. According to a more specific feature, the sets of pressure rollers, or only individual ones of these sets, are pivotally mounted for vertical motion about a horizontal axis and also adjustable for horizontal motion about a vertical pivot axis. As a result, the pressure rollers also serve as a straight-motion guide for the conveyor belt. Instead of providing the lower belt or the upper belt with the above-mentioned marginal ledges for lateral confinement of the conveying spaces, the two conveyor belts may also be pressed against each other at their respective edges.

Figure 2:
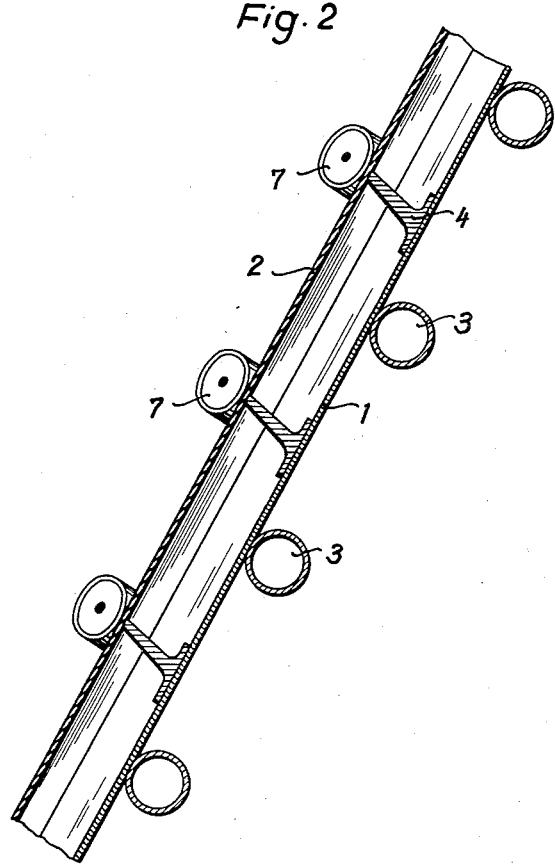

The drawing illustrates, by way of example, an embodiment of a steep-slope conveyor according to the invention in cross-section shown in Fig. 1, and in a schematic side view shown in Fig. 2.

The illustrated conveyor comprises two endless belts, namely, a lower belt 1 whose upper run is effective to convey the material, and an upper belt 2 whose lower run extends longitudinally along and above the carrying run of the lower belt and forms a travelling cover for the conveying spaces. The carrying run of belt 1 rests upon troughing rollers 3 of which the two outer ones are inclined in order to obtain the desired trough shape of the belt. The belt 1 has integral partitioning members 4 which extend in the transverse direction of the belt and subdivided into a longitudinal series of box-shaped sections to receive the material to be conveyed. For laterally confining the spaces of the conveying sections, the belt 1 has two marginal ledges 5 which extend on both sides respectively of the partitioning members 4 close to the edges of the belt. The partitioning members 4 and ledges 5 are formed as integral parts of the belt 1 consisting, for instance, of rubberized and rubber-coated multi-ply textile. The return run of conveyor belt 1 is guided by sets of idlers 6, of which each set is rotatably mounted on a shaft 6'.

The lower run of cover belt 2 is pressed upon the upper edges of the partitioning members 4 and of the marginal ledges 5. The necessary pressure is provided by means of pressure rollers 7. Thus, the partitioned conveyor belt 1 and the cover belt 2 form individually enclosed conveying spaces for the reception of the material. The pressure rollers 7 are mounted in pairs on respective shafts 7' which are pivotally linked to the supporting frame structure 8 of the conveyor so as to be displaceable for vertical motion about a horizontal pivot pin 8'. The other ends of the roller shafts 7' are linked to pull rods 9 which are urged downwardly by respective springs 10 bracing themselves against bracket 14 of the frame structure 8. The force of springs 10 can be adjusted by means of nuts 11 so that the pressure exerted by the pressure rollers upon the active run of belt 2 can be varied as may be desired.

The pressure rollers 7 also operate as a straight-motion guide for the conveyor belt by being horizontally rotatable about a vertical pivot axis. For this purpose, a pivot bearing 12 is mounted on a holder 13 which is pivotally joined with the frame structure 8 by a vertical pivot 13'. For the same purpose, the abutment for the springs 10 is formed by an intermediate structure 14 which is pivotally joined with the frame structure 8 by means of a vertical pivot pin 15 whose axis is vertically alined with that of pivot 13'.

It will be apparent to those skilled in the art, upon a study of this disclosure, that my invention permits of various modifications and may be embodied in devices other than the one particularly illustrated and described, without departing from the essential features of my invention, and within the scope of the claims annexed hereto.

I claim:

1. A steep-slope conveyor comprising two endless belts disposed one immediately above the other and continuously operable at the same speed, said upper belt being arranged to span the entire width of said lower belt so as to form a shield thereover, the lower belt having an upper carrying run and the upper belt having a lower pressure run extending along and adjacent to said carrying run, said lower belt being unconnected and separate from said upper belt throughout the mutual length of both said belts, said lower belt having transversely extending partition members fixedly attached to said lower belt to form a series of container trough sections along the carrying run of the belt, and pressure rollers engaging the pressure run of the upper belt from above and maintaining it in pressure engagement with said members.

2. A steep-slope conveyor comprising two endless belts disposed one above the other and continuously operable at the same speed, the lower belt having an upper carrying run and the upper belt having a lower pressure run extending along and adjacent to said carrying run, said lower belt having transversely extending partitioning members fixedly attached to said lower belt to form a series of retainer sections along the belt, each of said members being subdivided transversely of the belt to permit troughing of said carrying run, troughing rollers engaging said carrying run from below, and pressure rollers engaging the pressure run of the upper belt from above and maintaining it in pressure engagement with said members.

3. In a steep-slope conveyor according to claim 1, one of said two belts having a marginal ledge extending longitudinally along both sides respectively of said members and laterally confining said sections.

4. A steep-slope conveyor comprising two endless belts disposed one above the other and continuously operable at the same speed, the lower belt having an upper carrying run and the upper belt having a lower pressure run extending along and adjacent to said carrying run, said lower belt being unconnected and separate from said upper belt throughout the mutual length of both said belts, said lower belt having transversely extending partitioning members fixedly attached to said lower belt to form a series of retainer sections along the belt, each of said members being subdivided transversely of the belt to permit troughing of said carrying run, and said lower belt having two marginal retaining ledges extending on both sides respectively of said members along the belt for laterally confining said sections, troughing rollers engaging said carrying run from below, and pressure rollers engaging the pressure run of the upper belt from above and maintaining it in pressure engagement with said members.

5. A steep- slope conveyor comprising two endless belts disposed one immediately above the other and continuously operable at the same speed, said upper belt being arranged to span the entire width of said lower belt so as to form a shield thereover, the lower belt having an upper carrying run and the upper belt having a lower pressure run extending along and adjacent to said carrying run, said lower belt having transversely extending partitioning members fixedly attached to said lower belt to form a series of container trough sections along the carrying run of the belt, and pressure rollers engaging the pressure run of the upper belt from above and maintaining it in pressure engagement with said members, and supporting means on which said pressure rollers are journalled, said supporting means being displaceable toward and away from said pressure run of said upper belt and comprising spring means of adjustable force urging said pressure run in the downward direction against said partitioning members.

6. A steep-slope conveyor comprising two endless belts disposed one above the other and continuously operable at the same speed, the lower belt having an upper carrying run and the upper belt having a lower pressure run extending along and adjacent to said carrying run, said lower belt having transversely extending partitioning members fixedly attached to said lower belt to form a series of retainer sections along the belt, and pressure means engaging said pressure run from above for urging it toward said members, said pressure means comprising a shaft and pressure rollers on said shaft, said shaft having a fixedly mounted horizontal pivot axis and being vertically displaceable about said horizontal axis.

7. A steep-slope conveyor comprising two endless belts disposed one above the other and continuously operable at the same speed, the lower belt having an upper carrying run and the upper belt having a lower pressure run extending along and adjacent to said carrying run, said lower belt having transversely extending partitioning members fixedly attached to said lower belt to form a series of retainer sections along the belt, and pressure rollers engaging the pressure run of the upper belt from above and maintaining it in pressure engagement with said members, a roller supporting structure on which said pressure rollers are journalled, spring means on said structure for urging said pressure rollers downwardly, said stucture having a fixedly mounted horizontal pivot axis and being vertically displaceable about said horizontal axis, and also having a vertical pivot axis and being horizontally displaceable about said vertical axis.

8. A steep-slope conveyor comprising two endless belts disposed one above the other and continuously operable at the same speed, the lower belt having an upper carrying run and the upper belt having a lower pressure run extending along and adjacent to said carrying run, roller means for supporting the carrier run of said lower belt in trough shape over at least a portion of its carrying run, a plurality of transversely extending partitioning members fixedly attached to said lower belt to form a series of retainer sections along the lower belt, each of said transverse partition members being formed in separate sections, the lateral ones of which being angularly movable toward and away from the center line of the conveyor as the carrying run belt flexes into and out of said trough shape, and pressure means engaging said pressure run from above for urging it toward said partitioning members, said pressure means comprising a shaft and pressure rollers on said shaft, said shaft having a fixedly mounted horizontal pivot axis and being vertically pivotable about said horizontal axis, and also having a vertical pivot axis and being horizontally displaceable about said vertical axis.

9. A steep-slope conveyor comprising two endless belts disposed one above the other and continuously operable at the same speed, the lower belt having an upper carrying run and the upper belt having a lower pressure run extending along and adjacent to said carrying run, roller means for supporting the carrier run of said lower belt in trough shape over at least a portion of its carrying run, a plurality of transversely extending partitioning members fixedly attached to said lower belt to form a series of retainer sections along the lower belt, each of said transverse partition members being formed in separate sections, the lateral ones of which being angularly movable toward and away from the center line of the conveyor as the carrying run belt flexes into and out of said trough shape, and pressure means engaging said pressure run from above for urging it toward said partitioning members, said pressure means comprising a shaft and pressure rollers on said shaft, said shaft having a fixedly mounted horizontal pivot axis and being vertically pivotable about said horizontal axis, and also having a vertical pivot axis and being horizontally displaceable about said vertical axis, and guide means for the return run of said lower belt, said guide means comprising a shaft and mutually spaced idler wheels on said shaft, the spacing between said idler wheels corresponding to the spacing between the separate sections of said transverse partition members so as to pass said idler wheels between said separate sections.

10. A steep-slope conveyor comprising two endless belts disposed one above the other and continuously operable at the same speed, the lower belt having an upper carrying run and the upper belt having a lower pressure run extending along and adjacent to said carrying run, roller means for supporting the carrier run of said lower belt in trough shape over at least a portion of its carrying run, a plurality of transversely extending partitioning members fixedly attached to said lower belt to form a series of retainer sections along the lower belt, each of said transverse partition members being formed in separate sections, the lateral ones of which being angularly movable toward and away from the center line of the conveyor as the carrying run belt flexes into and out of said trough shape, and ledge means fixed to one of said belts extending longitudinally of said one of said belts and laterally of said transverse partition members, and pressure means engaging said pressure run from above for urging it toward said partitioning members, said pressure means comprising a shaft and pressure rollers on said shaft, said shaft having a fixedly mounted horizontal pivot axis and being vertically pivotable about said horizontal axis, and also having a vertical pivot axis and being horizontally displaceable about said vertical axis, and guide means for the return run of said lower belt, said guide means comprising a shaft and mutually spaced idler wheels on said shaft, the spacing between said idler wheels corresponding to the spacing between the separate sections of said transverse partition members so as to pass said idler wheels between said separate sections.

11. A steep-slope conveyor comprising two endless belts disposed one above the other and continuously operable at the same speed, the lower belt having an upper carrying run and the upper belt having a lower pressure run extending along and adjacent to said carrying run, roller means for supporting the carrier run of said lower belt in trough shape over at least a portion of its carrying run, a plurality of transversely extending partitioning members fixedly attached to said lower belt to form a series of retainer sections along the lower belt, each of said transverse partition members being formed in separate sections, the lateral ones of which being angularly movable toward and away from the center line of the conveyor as the carrying run belt flexes into and out of said trough shape, and ledge means fixed to one of said belts extending longitudinally of said one of said belts and laterally of said transverse partition members, and pressure means engaging said pressure run from above for urging it toward said partitioning members, said pressure means comprising a shaft and pressure rollers on said shaft, and adjusting means attached to said shaft for varying the pressure of said pressure rollers on said upper belt to urge said upper belt against said partition members, said shaft having a fixedly mounted horizontal pivot axis and being vertically pivotable about said horizontal axis, and also having a vertical pivot axis and being horizontally displaceable about said vertical axis, and guide means for the return run of said lower belt, said guide means comprising a shaft and mutually spaced idler wheels on said shaft, the spacing between said idler wheels corresponding to the spacing between the separate sections of said transverse partition members so as to pass said idler wheels between said separate sections.

References Cited in the file of this patent

UNITED STATES PATENTS

| 1,624,703 | Witte | Apr. 12, 1927 |
| 2,286,250 | Albertoli | June 16, 1942 |
| 2,805,762 | Kampfer | Sept. 10, 1957 |

FOREIGN PATENTS

| 341,023 | Great Britain | Jan. 5, 1931 |
| 418,677 | Great Britain | Oct. 29, 1934 |
| 721,937 | Great Britain | Jan. 12, 1955 |
| 728,901 | Great Britain | Apr. 27, 1955 |
| 1,123,345 | France | Sept. 20, 1956 |